(12) United States Patent
Hutchison et al.

(10) Patent No.: US 7,206,617 B2
(45) Date of Patent: Apr. 17, 2007

(54) MOBILE COMMUNICATION DEVICE AND A COVER FOR THE SAME

(75) Inventors: Mark Hutchison, Hampshire (GB); Cedric Allum, Buckinghamshire (GB)

(73) Assignee: Vertu Limited, London (GB)

( * ) Notice: Subject to any disclaimer, the term of this patent is extended or adjusted under 35 U.S.C. 154(b) by 389 days.

(21) Appl. No.: 10/813,809

(22) Filed: Mar. 30, 2004

(65) Prior Publication Data

US 2004/0204206 A1 Oct. 14, 2004

(30) Foreign Application Priority Data

Apr. 1, 2003 (GB) ................... 0307519.9
Apr. 2, 2003 (GB) ................... 0307612.2

(51) Int. Cl.
*H04M 1/00* (2006.01)
(52) U.S. Cl. ............... 455/575.3; 455/575.4; 379/433.07
(58) Field of Classification Search ........... 455/550, 455/575.1, 575.2, 575.3, 575.4, 550.1; 379/433.01, 379/433.04, 433.05, 433.06, 433.07
See application file for complete search history.

(56) References Cited

U.S. PATENT DOCUMENTS

| | | | |
|---|---|---|---|
| 3,693,755 A * | 9/1972 | Terayama | 182/102 |
| 5,678,206 A * | 10/1997 | Ishii | 455/575.8 |
| 6,147,314 A | 11/2000 | Han et al. | 200/343 |
| 6,320,963 B1 * | 11/2001 | Whitney | 379/447 |
| 7,019,985 B2 * | 3/2006 | Lefort | 361/814 |
| 7,106,857 B1 * | 9/2006 | Hyotylainen | 379/433.04 |
| 2002/0039890 A1 * | 4/2002 | Kim | 455/90 |
| 2002/0056614 A1 | 5/2002 | Amari et al. | |
| 2003/0211834 A1 * | 11/2003 | Wu et al. | 455/90.3 |

FOREIGN PATENT DOCUMENTS

| | | |
|---|---|---|
| DE | 90 13 577 U | 1/1992 |
| EP | 0 546 468 A | 6/1993 |
| GB | 2 371 019 A | 7/2002 |

* cited by examiner

*Primary Examiner*—Edward F. Urban
*Assistant Examiner*—Nhan T. Le
(74) *Attorney, Agent, or Firm*—Harrington & Smith, PC

(57) ABSTRACT

A mobile telephone (1) comprising keys (5 to 10, rows 11 to 14) hinged from the end opposite to a display (2) so as to allow positioning of the keys partly over the display (2) to place soft keys (5,7) next to respective legends (3,4) shown on the display (2).

12 Claims, 2 Drawing Sheets

MOBILE COMMUNICATION DEVICE AND A COVER FOR THE SAME

FIELD OF THE INVENTION

This invention relates to a mobile communication device and a cover for the same. The invention relates particularly, but not exclusively, to an input arrangement for mobile communication devices.

BACKGROUND OF THE INVENTION

Various mobile devices have keys for receiving user input such as text, numbers or user commands. Such keys often contain a legend printed on a key cap, as in a wired or wireless telephone or Personal Digital Assistant (PDA) device. On some occasions, the function of a key may vary and a legend associated with the key is displayed. For instance, Nokia™ 6110 mobile telephone had a display and two so-called soft-keys which were keys in the proximity of the display and whose legends were shown on the display during normal operation of the mobile telephone.

The keys of the aforementioned mobile telephone were implemented by means of a key mat providing user actuatable keys as protrusions which would relay the user actuation onto co-aligned membrane switches deposited onto a surface of a circuit board inside the mobile telephone. The keys were supported sideways in respect to the direction of their actuation by a key frame or so-called A-cover that contained co-aligned apertures for the keys. Consequently, a key arrangement was provided which occupied a relatively small depth and provided keys reasonably robust and convenient to use. The key arrangement is also very well suited for mass production, as it provides a joint assembly process for numerous keys and is thus relatively fail-safe as well. However, such keys must generally be supported over their entire surface such that they cannot be placed quite next to the display, for instance to provide a pair of a key and its associated legend in so-called soft key concept.

SUMMARY OF THE INVENTION

According to a first aspect of the invention there is provided a mobile communication device, comprising:
  a body;
  a display attached to the body and occupying a display region of the mobile communication device; and
  a key hinged to the body and pivotable about a pivot axis, the key occupying a key region of the mobile communication device for actuation of the key; wherein
  the key region resides between the display region and the pivot axis.

The hinging may hold the key solidly only allowing it to slightly rotate about its pivot axis. It also allows the key cap to overlap the display without the need to have a support adjacent to the display region or around the perimeter of the key, as the pivot point for the keys closest to the display is towards the edge remote from the display.

The part of the key available to a user to actuate may be spaced apart radially from the key pivot i.e. beyond the bottom edge of the key. This allows the key be used over its entire surface available to the user. This also allows an array of keys to be closed practically abutted to each other.

The mobile communication device may comprise a resilient biasing member on the side opposing to that of the key in respect to the pivot axis so as to spring back the key after actuation by a finger. The mobile communication device may comprise a stopper configured to align the key in rest. Hence, the key will provide an accurate tactile response whilst no springs will be needed at the part of the key that engages with a switch or with the part of the key that extends over the display.

Advantageously, the key is supported sideways by its hinging and hence a key frame to support the key sideways can be dispensed with. Further advantageously, the hinging of the key enables actuating the key next to the legend shown on the display, hence providing a great extent of intuitiveness.

The device may comprise two or more hinged keys adjacent to each other. The adjacent keys may form a continuous band of keys. The two keys may form a continuous boundary for the display. The keys may define a continuous surface except for a small gap needed between the keys to allow their separate movement. The key or keys may be made of a material that remains substantially rigid in normal operation thus providing a high-class touch. The key or keys may be made of a metal or an alloy or the key may contain a top surface layer made of a metal or alloy.

The two adjacent keys may share a common pivoting axle. The two adjacent keys may share a common pivoting axis.

The communication device may contain a group of hinged keys aligned in a matrix in which the keys form a substantially continuous surface. The surface may extend substantially from one edge of the communication device to another edge of the device. Hence, the entire width of the communication device may be covered by keys so that a relatively small communication device that is convenient to transport may provide conveniently large keys.

The keys may be arranged to provide a numeric telephone keypad.

According to a second aspect of the invention there is provided a cover for a mobile communication device, comprising:
  a window for providing a visual access to a display of the mobile communication device and occupying a display region of the cover; and
  a key hinged to the cover and pivotable about a pivot axis, the key occupying a key region of the cover for actuation of the key; wherein
  the key region resides between the display region and the pivot axis.

The key region may extend over the window so as to provide a boundary for a display when the cover is attached to a mobile communication device.

It should be appreciated that the embodiments of any one aspect may produce corresponding advantages when combined with different other aspects as well and that they can be combined where applicable.

BRIEF DESCRIPTION OF THE DRAWINGS

The invention will now be described, by way of example only, with reference to the accompanying drawings, in which.

DETAILED DESCRIPTION OF THE INVENTION

Figure 1:
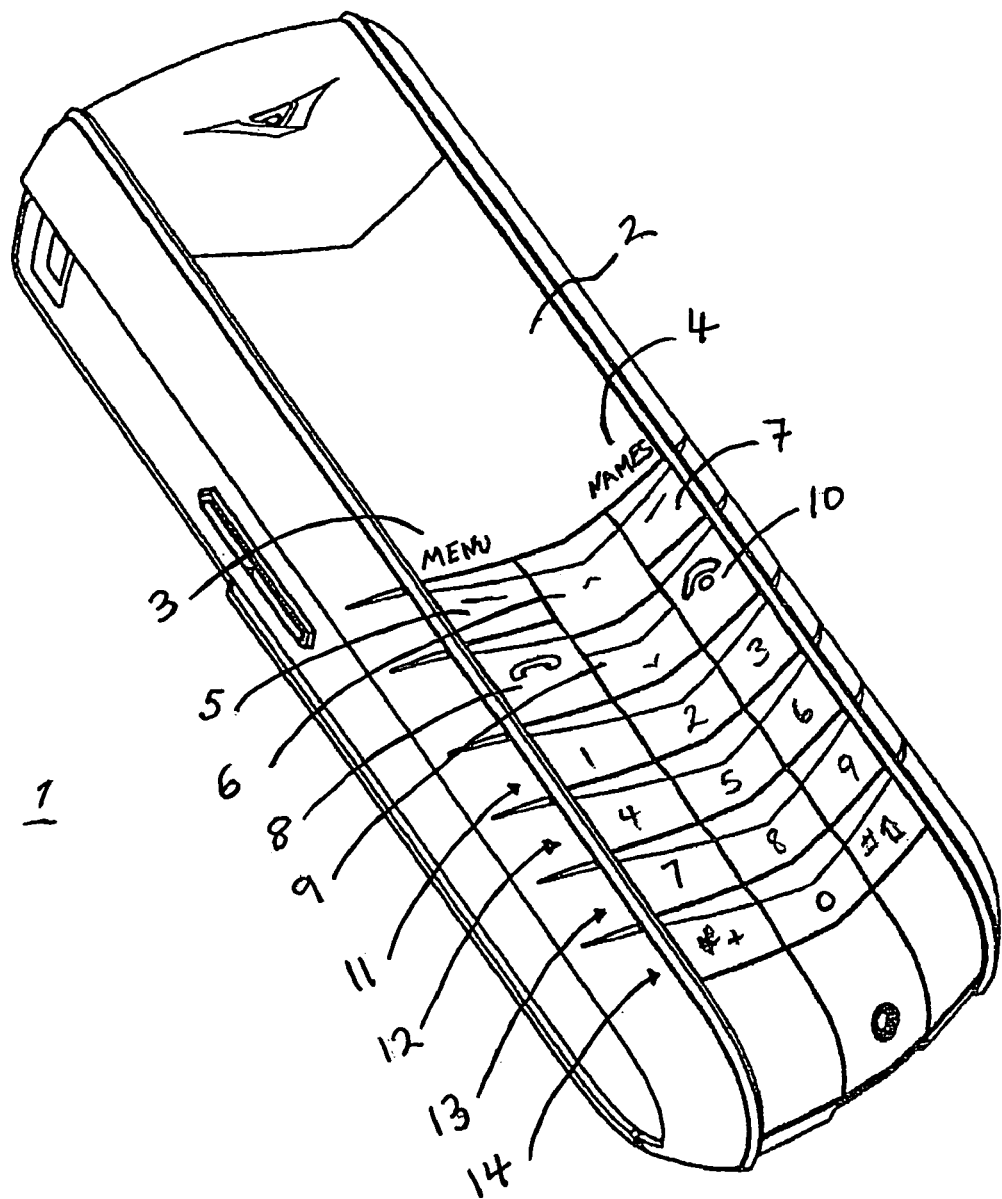
FIG. 1 illustrates an example mobile communication device according to a preferred embodiment of the invention.

FIG. 1 illustrates a mobile communication device 1 according to a preferred embodiment of the invention. The mobile communication device 1 comprises a display 2 which can show legends 3 and 4. The mobile communication device 1 further comprises a row of keys 5 to 7 providing a boundary for the display 2. Keys 5 and 7 correspond with the legends 3 and 4. These keys 5 and 7 have been intended for use as so-called soft-keys wherein their operation varies and is reflected by the legends so that a user would know their function at different points of time. The mobile communication device 1 also comprises keys for scrolling up, down, call, an hang-up numbered as 6, 8, 8 and 10, respectively. Further, the mobile communication device has rows 11 to 14 of normal telephone keypad keys. The keys in each row have been hinged or pivotally attached to the mobile communication device 1 by individual pivot axles residing inside the body of the mobile communication device 1. Minute gaps have been provided between the keys to allow their individual actuation. The display 2 has a frame region 12 surrounding the display 2 and substantially covered or concealed by the keys 5 to 7 which extend over the display 2 up to the portion where information can be displayed to a user. Hence, the keys 5 to 7 provide a boundary for the display 2.

FIG. 1 also helps to illustrate an advantage gained by pivotally attaching the keys 5 to 7 so that they can be actuated at the boundary they form to the display: when held by a single hand, the mobile communication device 1 provides a relatively long distance between the keys 5 to 7 and the lower end of the mobile communication device 1. This is advantageous particularly with small devices having the length of approximately 10 cm or less as the actuation of the keys can be moved as close as possible to the display 2 and far from the lower end of the mobile communication device 1 shown in FIG. 1.

Figure 2:
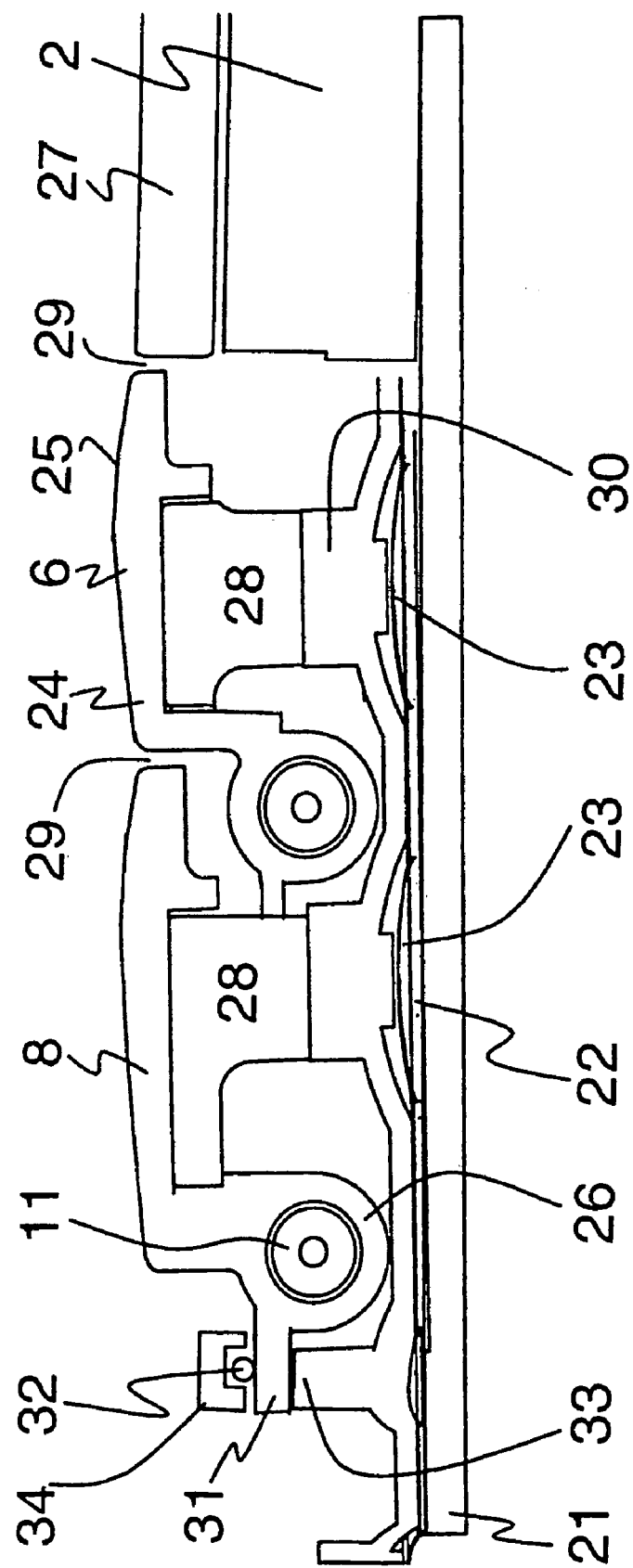
FIG. 2 illustrates a detail of the cross-section of the mobile communication device of FIG. 1.

FIG. 2 illustrates a detail of the cross-section of the mobile communication device 1 of FIG. 1. FIG. 2 shows a body 21, circuit board 22 attached to the body 21, a switch 23 attached to the circuit board and a bent metal plates 24 providing an actuation surface 25 of the key 6 and also forming a loop 26 so as to hinge to the mobile communication device 1 via the pivot axle 11. Corresponding parts of key 8 have also been shown. FIG. 2 further illustrates a lever 31 attached to the loop 26 and extending to a direction opposite to that of the key 8. Corresponding parts of key 6 have not been drawn. The lever 31 is biased by a spring 32 against a stopper 33 when the key 8 is not actuated. The stopper 33 is positioned such that the key 8 does not over rotate when returned by the spring but aligns with surrounding keys. A key movement limiter 34 is also provided about the spring to stop the key at the end of its designed actuation motion so as to protect the switch 23 from excessive forces. The spring 32 may be a helical spring, or a lateral spring, a pneumatic spring, an elastic band or sheet, particularly an elastomeric sheet, or any other means for providing a resilient bias to return the key after it has been actuated or depressed.

The switch 23 may be a commonly known microswitch. Alternatively, the switch 23 may be a membrane switch and actuated with an actuation member 28 that may be fixed to the reverse side of the metal plate 24 that forms the key 6. Further alternatively, the membrane switch may be supported into the proximity of the metal plate 24 so that no actuation relaying members or only a relatively short protrusion on the switch 23 or on the metal plate 24 will be needed. On actuating the key 6, the actuation member 28 relays the force to the switches 23 via a key mat 30 disposed between the keys and the switches. The key mat 30 has deforming domes aligned with the switches and the actuation members 28 to provide a snap response.

The mobile communication device 1 further comprises a bearing (not shown) for attaching the pivoting axle 11 to the mobile communication device 1. FIG. 2 also shows the minute gaps 29 left between the abutting keys 8 and 6 and between key 6 and a window or lens 27 of the display 2.

Whilst the preferred embodiment employed separate hinges, other embodiments use an integrated hinge provided by the metal plate 24. The metal plate may comprise a flexible deflecting line or region over which the plate may deflect so that no separate hinge is needed.

The present invention may be embodied in various forms without departing from its essential attributes. It should be appreciated that the entire detailed description describes a preferred embodiment and can be freely varied by removing, replacing or adding features of this detailed description. That the various features described are optional has not been emphasised for each feature only in sake of clarity and conciseness of the description. Furthermore, each feature disclosed in this specification (which terms includes the claims) and/or shown in the drawings may be incorporated in the invention independently of other disclosed and/or illustrated features. In this regard, the invention includes any novel feature or combination of features disclosed herein either explicitly, implicitly or any generalisation thereof irrespective of whether or not it relates to the claimed invention or mitigates any or all of the problems addressed.

The appended abstract as filed herewith is included in the specification by reference.

The invention claimed is:

1. A mobile communication device, comprising:
   a body having a first side and a second opposing side;
   a display overlying a first portion of the first side of the body and occupying a display region of the mobile communication device; and
   a key independently hinged to a second portion of the first side of the body and pivotable about a pivot axis, a portion of the key overlying a third portion of the first side of the body and occupying a key region of the mobile communication device for actuation of the key;
   wherein the key region resides between the display region and the pivot axis and the third portion of the body resides between the first and second portions.

2. A mobile communication device according to claim 1, wherein the part of the key available to a user to actuate is spaced apart radially from the pivot axis.

3. A mobile communication device according to claim 1, further comprising a resilient biasing member on the side opposing to that of the key in respect to the pivot axis so as to spring back key after actuation by a finger.

4. A mobile communication device according to claim 1, comprising a key aligner adapted to align the key at rest to a predetermined rest position.

5. A mobile communication device according to claim 1, comprising two hinged keys adjacent to each other.

6. A mobile communication device according to claim 5, wherein the adjacent keys may form a continuous band of keys.

7. A mobile communication device according to claim 5, wherein the two keys may form a continuous boundary for the display.

8. A mobile communication device according to claim 1, comprising a group of hinged keys aligned in a matrix in which the keys form a substantially continuous surface.

9. A mobile communication device according to claim 8, wherein the mobile communication device is a cellular telephone.

10. A mobile communication device according to claim 1, wherein the key region resides adjacent the display region.

11. A mobile communication device, comprising:

a body having a first side and a second opposing side;

a display overlying a first portion of the first side of the body and occupying a display region of the mobile communication device;

a plurality of hinges, each of which hinges a different key; and a first key hinged via a first one of the plurality of hinges to a second portion of the first side of the body and pivotable about a pivot axis, a portion of the first key overlying a third portion of the first side of the body and occupying a key region of the mobile communication device for actuation of the first key; wherein the key region resides between the display region and the pivot axis and the third portion of the body resides between the first and second portions.

12. A mobile communication device, comprising:

a body having a first side and a second opposing side;

a display overlying a first portion of the first side of the body and occupying a display region of the mobile communication device; and a plurality of hinges, each of which hinges a different key;

a first key hinged via a first one of the plurality of hinges to a second portion of the first side of the body and pivotable about a first pivot axis, a portion of the first key overlying a third portion of the first side of the body and occupying a first key region of the mobile communication device for actuation of the first key; and a second key hinged via a second one of the plurality of hinges to a fourth portion of the first side of the body and pivotable about a second pivot axis, a portion of the second key overlying a fifth portion of the first side of the body and occupying a second key region of the mobile communication device for actuation of the second key;

wherein the first key region resides between the display region and the first pivot axis and the third portion of the body resides between the first and second portions and the second key region resides between the display region and the second pivot axis and the fifth portion of the body resides between the first and fourth portions.

* * * * *